United States Patent Office 3,097,195
Patented July 9, 1963

3,097,195
POLYMERIZATION OF ACETYLENE COMPOUNDS
George W. Kennerly, Darien, David S. Hoffenberg, Stamford, and George C. Gleckler, Springdale, Conn., assignors to American Cyanamid Company, New York, N.Y., a corporation of Maine
No Drawing. Filed Dec. 16, 1960, Ser. No. 76,128
13 Claims. (Cl. 260—94.1)

This invention relates broadly to certain new and useful improvements in a method of polymerization. More particularly, it is concerned with a method of polymerizing a polymerizable material comprising (or consisting essentially of) a polymerizable compound having acetylenic (triple-bonded) unsaturation between adjacent carbon atoms, specifically, acetylene, $CH \equiv CH$.

It was known prior to the present invention to polymerize acetylene and mono-substituted acetylenes alone or admixed with each other or with other polymerizable materials containing ethylenic and/or acetylenic unsaturation between adjacent carbon atoms. It also was known that the polymerization of polymerizable materials that include a compound or compounds having acetylenic unsaturation between adjacent carbon atoms is aided (and the properties imparted to the polymer are influenced) by the particular catalyst or catalyst system employed in the polymerization.

The present invention is especially concerned with new and unobvious improvements in the polymerization of polymerizable materials comprising or including acetylene and which comprises carrying out the polymerization reaction in a liquid reaction medium in which the said material is inert with the aid of a polymerization catalyst system consisting of both (a) at least one salt of the group consisting of nickel salts and cobalt salts, and (b) at least one substance of the group consisting of the alkali metals and the alkali-metal acetylides [mono- and/or di-(alkali-metal) acetylides].

The instant invention is based on our discovery that the catalyst system described in the preceding paragraph is a highly efficient system when used in polymerizing polymerizable materials comprising acetylene, e.g., acetylene alone. Its use provides a maximum yield of polymer (stated with respect to the catalyst components) with minimum consumption of the catalyst components. This fact, together with the fact that the catalyst components are readily available and relatively inexpensive, makes it possible to produce a polymer of acetylene at lower cost than previously has been possible. Furthermore, a polyacetylene of greater commercial value is obtained since the polymer resulting from the method of this invention has a unique density, particle size and color. The present invention also makes it possible to introduce a large variety of end groups into polyacetylene. The process is highly efficient in effecting the polymerization reaction at atmospheric pressure; and, also, with respect to the consumption of catalyst, in the time required for completing the reaction, in the overall conversion of monomeric acetylene or polymerizable mixtures containing the same to a polymer thereof, in convenience, and in the relative simplicity and cost of the apparatus required.

In carrying the invention into effect the acetylenic compound, specifically acetylene (alone or together with the metallic salt component of the catalyst system), is generally added to the liquid reaction medium at a temperature of from 40° C. (advantageously from about 50° C.) to, for example, about 100° or 110° C. or even 150° C. or higher. The lower temperature is critical (especially from a practical standpoint) but the upper temperature is not critical from an operative standpoint except that, in general, the yield of polymer goes down as the temperature of polymerization goes up. Usually the polymerization reaction is allowed to proceed to completion (substantial completion) at a temperature of from about 40° or 50° C. to about 100° C.

The liquid reaction medium employed is preferably one that has a high solubility for the acetylenic compound, as well as reasonably good solubility for the nickel or cobalt salt employed. Dimethylformamide is particularly useful as the liquid medium in which the reaction is effected.

All or part of the acetylene may be added to the liquid reaction medium prior to the addition of (a) a nickel and/or cobalt salt, and (b) an alkali metal and/or an alkali-metal acetylide. A preferred practice comprises saturating the liquid reaction medium with acetylene, adding the metallic salt of (a) to the acetylene-saturated liquid medium, and then, while continuing the addition of acetylene, adding a dispersion or slurry of the substance of (b) in a liquid diluent, e.g., benzene, toluene, xylene, hexane, heptane, etc. The flow of acetylene is continued (after all of the components of the catalyst system have been added) until no more acetylene is absorbed.

The molar quantity of metallic salt (cobalt and/or nickel salt) employed is preferably equal to at least $\frac{1}{1000}$ of the number of moles of the acetylenic compound, specifically acetylene, present in the liquid, reaction medium. It may be as much as, for example, $\frac{1}{25}$ of the number of moles of the acetylene compound in the liquid, reaction medium, but preferably is between $\frac{1}{100}$ and $\frac{1}{500}$ of the molar amount of the acetylenic compound.

The amount of alkali metal and/or alkali-metal acetylide that is added to the liquid mass containing the acetylene, and which is usually added either subsequently to or concurrently with the addition of the metallic-salt component, generally is such that the molar ratio of alkali metal and/or alkali-metal acetylide to the metallic-salt component is between 10:1 and 1:100, more particularly between 5:1 and 1:50. In practicing the present invention it is sometimes advantageous that the addition of the alkali metal and/or alkali-metal acetylide be completed before any appreciable polymerization of the acetylene has occurred.

Since the excess metallic salt is recoverable and reuseable, it is often desirable to have an excess of the metallic salt present in the reaction mass. (By "excess" metallic salt is meant the amount of metallic salt which is above that required to form an active catalytic complex whereby there is utilized all of the alkali metal and/or alkali-metal acetylide.)

When the polymerization reaction has proceeded to substantial completion under the temperature conditions hereinbefore specified, the polymeric reaction product is isolated from the reaction mass by conventional methods that are well known to those skilled in the art, for instance as described in the examples which follow.

Illustrative examples of inert (substantially inert) liquids that may be used as the reaction medium are hydrocarbons, e.g., petroleum ether, cyclohexane, n-pentane, heptane, octane, nonane, benzene, toluene, xylene, etc.; aliphatic, cycloaliphatic or aliphatic-substituted aromatic ethers, e.g., diethyl ether, ethyl isopropyl ether, methyl heptyl ether, isopropyl phenyl ether, hexyl phenyl ether, ethyl octyl ether, 1,2-dimethoxyethane, bis-(2-methoxyethyl) ether, tetrahydrofuran, dioxane, etc.; aliphatic nitriles, e.g., acetonitrile, propionitrile, etc.; amides such as dimethylformamide, N,N-dimethylacetamide, etc.; N-methyl-2-pyrrolidone; and others.

The chosen reaction medium or solvent, if not normally a liquid, should be liquefiable at reaction temperature. As has been indicated hereinbefore, the solvent advantageously is one which is inert to the acetylene, to the catalyst components and to the reaction product, more particularly polymeric reaction product, under the conditions employed in bringing the ingredients together and in allowing the polymerization reaction to proceed to substantial completion.

The concentration of the acetylene in the liquid reaction medium may be considerably varied, for example from about 1% to 50% or even as high as 75% or more by weight of the total amount of the acetylene plus the liquid reaction medium.

The catalyst system used in practicing the present invention is useful, to the best of our knowledge and belief, in polymerizing any polymerizable material comprising acetylene. The polymerizable material can be acetylene alone, or acetylene in combination with one or more (two, three, four or any higher number of) other polymerizable materials including those containing olefinic and/or acetylenic unsaturation in the molecule. The selected comonomer or comonomers can be used in any proportions with the acetylene, e.g., from 0.1:99.9 mole percent of the former to 99.9 to 0.1 mole percent of the latter. In polymerizing such monomeric mixtures, we prefer to use a substituted acetylene as the comonomer. The preferred substituted acetylene is one represented by the general formula (I)        $RC \equiv CH$ where R represents a member of the class consisting of alkyl, alkenyl, alkynyl, aralkyl, aryl, alkaryl, and cyano radicals, and mono- and poly- (i.e., multi-) esterified carboxy-substituted, mono- and polyalkylamino-substituted, mono- and polycyano-substituted, and mono- and polyaryloxy-substituted alkyl, alkenyl, alkynyl, aryl, alkaryl and aralkyl radicals.

Examples of compounds embraced by Formula I are monomethyl through mono-octadecyl acetylenes (including the isomeric forms thereof, and the cycloalkyl acetylenes such as cyclopentyl, cyclohexyl, cycloheptyl, etc., acetylenes), and other monoalkyl acetylenes; vinylacetylene ($CH_2=CH-CH\equiv CH$), 3 - vinylpropyne - 1 ($CH_2=CH-CH_2-C\equiv CH$), isopropenyl acetylene

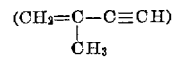

1,5-hexadiyne $[CH\equiv C-(CH_2)_2-C\equiv CH]$, 1,6-heptadiyne $[CH\equiv C-(CH_2)_3-C\equiv CH]$, 1,7-octadiyne, 1,8-nonadiyne, and other monoalkenyl acetylenes and monoalkynyl acetylenes; the benzyl, phenylethyl, phenylpropyl and other monoaralkyl acetylenes; phenyl, biphenylyl or xenyl, naphthyl and other monoaryl acetylenes; the tolyl, xylyl, ethylphenyl, propylphenyl, methyl- and dimethylnaphthyl and other monoalkaryl acetylenes. Other examples of mono-hydrocarbon-acetylenes that can be copolymerized with acetylene using the catalyst system employed in practicing the present invention will be apparent to those skilled in the art from the foregoing illustrative examples.

Examples of compounds embraced by Formula I wherein R represents a mono-(substituted hydrocarbon) acetylene are the mono- and poly- (i.e., where the structure permits, di-, tri-, tetra-, penta- and higher multi-) esterified carboxy-substituted, mono- and polyamino-substituted, mono- and polyalkylamino-substituted, mono- and poly cyano-substituted and mono- and polyaryloxy-substituted alkyl, alkenyl, alkynyl, aryl, alkaryl and aralkyl acetylenes corresponding to those monohydrocarbon-substituted acetylenes given by way of example in the preceding paragraph and elsewhere herein. The specific names of some of the mono-(substituted hydrocarbon) acetylenes that can be copolymerized with acetylene as herein described are propargyl acetate, ethyl propiolate, and N,N-diethylaminomethylacetylene.

Illustrative examples of nickel and cobalt salts that can be used in practicing the present invention are nickel chloride hexahydrate, nickel bromide trihydrate, nickel nitrate hexahydrate, nickel acetate tetrahydrate, nickel naphthenate, nickel formate, nickel sulfate hexahydrate, nickel sulfate heptahydrate, nickel oxalate dihydrate, nickel orthophosphate octahydrate, cobalt chloride dihydrate, cobalt chloride hexahydrate, cobalt bromide hexahydrate, cobalt acetate tetrahydrate, anhydrous cobalt naphthenate, anhydrous cobalt toluate, cobalt nitrate hexahydrate, cobalt formate dihydrate, cobalt oxalate and cobalt iodoplatinate monohydrate, or the anhydrous modifications of the aforementioned hydrated salts. Other examples are given in the copending applications of Lionel B. Luttinger, Serial No. 844,632, filed October 6, 1959; Serial No. 857,495, filed December 7, 1959; and Serial No. 857,498, also filed December 7, 1959. These same applications all disclosed, both generically and specifically, additional examples of acetylenic compounds that can be used as comonomers with acetylene in practicing this invention. All of these copending applications are assigned to the same assignee as that of the present invention.

As the other component of the catalyst system there can be used any of the alkali metals (sodium, potassium, lithium, caesium, or rubidium) or any of the mono- or di-(alkali-metal) acetylides. In such acetylides the alkali metal can be sodium, potassium, lithium, rubidium or caesium. A preferred acetylide is one represented by the general formula (II)        $R'C \equiv CMe$ where R' represents hydrogen or an alkali metal and Me represents an alkali metal. Other acetylides that can be used are, for example, those represented by the general formula (III)        $RC \equiv CMe$ where R has the same meaning as given above with reference to Formula I and Me represents an alkali metal.

The liquid homopolymers and copolymers resulting from the method of this invention are useful as synthetic drying oils that can be employed, for example, as components of paints, varnishes, enamels, etc. Others can be used as chemical intermediates, for instance in making polyalcohols, polymethoxides, methoxy resins, etc. They can be totally hydrogenated to form saturated aliphatic compounds. Or, they can be partly hydrogenated to yield products having both saturated and unsaturated bonds between adjacent carbon atoms and which, therefore, constitute products having properties intermediate the totally hydrogenated and non-hydrogenated polymers.

In order that those skilled in the art may better understand how the present invention can be carried into effect, the following examples are given by way of illustration and not by way of limitation. All parts and percentages are by weight unless otherwise stated.

*Example 1*

In a one-liter, 3-necked Morton flask equipped with a gas-inlet tube, thermometer, mechanical stirrer and reflux condenser is placed 400 ml. of dimethylformamide. The solvent is heated to 70° C., saturated with acetylene at that temperature and then 2.6 grams (0.011 mole) of $NiCl_2.6H_2O$ is added. Then, while the flow of acetylene is continued at the rate of 0.5 mole/hr. a slurry of 20% sodium acetylide (monosodium acetylide) in xylene is added in such a quantity that 0.055 mole of real monosodium acetylide is added over a 15-minute period. The flow of acetylene is then continued for 4¼ hours, after which time no more is absorbed. The solvent is then evaporated under reduced pressure, and the product dried in a vacuum oven. After washing the product with benzene, heptane, acetone, dilute HCl, methanol and acetone again, and after drying it again there is isolated 20 grams of polyacetylene having the characteristic infrared absorption peak at $1015^{-1}$ cm. This yield of polyacetylene corresponds to 64 moles of acetylene polymerized for each mole of $NiCl_2.6H_2O$ employed and 14 moles of acetylene polymerized for each mole of monosodium acetylide used.

Similar results are obtained when an equivalent amount of preferred disodium acetylide slurried in xylene is substituted for the above-described slurry of 20% preformed monosodium acetylide in xylene.

Example 2

Essentially the same procedure is followed as described under Example 1 with the exception that 2.67 g. metallic potassium is used in place of 2.72 g. of real sodium acetylide, and the reaction temperature is 75° C. The yield of polyacetylene is 15 moles thereof per mole of metallic potassium and 80 moles thereof per mole of $NiCl_2.6H_2O$.

Example 3

The procedure is essentially the same as that given under Example 1 with the exception that 2.48 g. metallic sodium dispersed in 5 ml. xylene is used in place of monosodium acetylide, and the reaction temperature is 100° C. The yield of polyacetylene is 8 moles thereof per mole of metallic sodium, and 40 moles thereof per mole of $NiCl_2.6H_2O$.

Example 4

The procedure of Example 1 is followed with the exception that 1.4 g. of anhydrous $NiCl_2$ is used in place of the 2.6 g. $NiCl_2.6H_2O$. Under these conditions the yield of polyacetylene is 28 g., corresponding to 90 moles of acetylene polymerized for each mole of anhydrous $NiCl_2$ and 19 moles of acetylene polymerized for each mole of monosodium acetylide.

Example 5

Aectylene is polymerized during a four-hour period at 70° C. as described under Example 1. In this case, however, 10.6 g. of a 6% cobalt (as cobalt naphthenate) solution is used in place of the $NiCl_2.6H_2O$. There is obtained a low yield of polyacetylene.

Example 6

In the equipment described in Example 1 is placed 500 ml. of dimethylformamide. The solvent is heated to 85° C., and 10.2 g. (0.1 mole) of phenyacetylene is added. The solution is then saturated with acetylene at that temperature, and 1.4 g. (0.011 mole) of anhydrous $NiCl_2$ is added. Then, while the flow of acetylene is continued at the rate of 0.3 mole/hr. 13.4 g. of a slurry of 20% monosodium acetylide in xylene (0.054 mole $NaC_2H$) is added over a ten-minute period. The flow of acetylene is continued for four hours, after which time no more is absorbed. Evaporation of the solvent and of the unreacted phenylacetylene yields 6 g. of dark brown-black polymeric residue, which is soluble in dimethylformamide and has an infrared spectrum consistent with a copolymer of acetylene and phenylacetylene.

Example 7

When a dimethylformamide solution of $NaC_2H$ and $NiCl_2.6H_2O$ in the proportions used in Example 1 is stirred for 2½ hours at 70° C. in the absence of acetylene, a black product is obtained. When acetylene is then passed into the solution, the acetylene polymerizes to polyacetylene. However, the yield of polymer is only 8 g. as compared with 20 g. in Example 1.

We claim:

1. The method of polymerizing a polymerizable material selected from the group consisting of (1) acetylene and (2) mixtures of (a) acetylene and (b) at least one other unsaturated organic material which is copolymerizable with acetylene and contains at least one double bond, said polymerization being carried out at a temperature of at least about 40° C. in an inert organic liquid medium with the aid of a polymerization catalyst system consisting solely of both (a) at least one salt of the group consisting of nickel salts and cobalt salts, and (b) at least one substance of the group consisting of the alkali metals and the alkali-metal acetylides.

2. A method as in claim 1 wherein the nickel salt of (a) is nickel chloride.

3. A method as in claim 1 wherein the substance of (b) is metallic sodium.

4. A method as in claim 1 wherein the substance of (b) is metallic potassium.

5. A method as in claim 1 wherein the substance of (b) is sodium acetylide.

6. A method as in claim 1 wherein the liquid reaction medium is dimethylformamide.

7. The method of obtaining polyacetylene which comprises effecting the polymerization of acetylene in an inert, organic liquid reaction medium at a temperature of from 40° C. to 150° C. with the aid of a polymerization catalyst system consisting soley of both a nickel salt and metallic sodium; and isolating the resulting polyacetylene from the reaction mass.

8. A method as in claim 7 wherein the nickel salt is nickel chloride.

9. The method of obtaining polyacetylene which comprises effecting the polymerization of acetylene in an inert, organic liquid reaction medium at a temperature of from 40° C. to 150° C. with the aid of a polymerization catalyst system consisting solely of both a nickel salt and sodium acetylide; and isolating the resulting polyacetylene from the reaction mass.

10. A method as in claim 9 wherein the nickel salt is nickel chloride.

11. The method of polymerizing acetylene which comprises saturating dimethylformamide with acetylene; adding nickel chloride to the resulting acetylene-saturated dimethylformamide; and adding to the resulting liquid mass a slurry of sodium acetylide dispersed in liquid organic diluent in which the said acetylide is inert while continuing the flow of acetylene to the said mass, the molar ratio of nickel chloride to sodium acetylide employed being between 5:1 and 1:50, and the polymerization of the acetylene being effected at a temperature within the range of about 40° C. to about 100° C.

12. The method of claim 1 wherein (b) is an unsaturated compound having at least two double bonds.

13. A method which comprises polymerizing a material selected from the group consisting of (1) acetylene and (2) mixtures of (a) acetylene and (b) at least one other unsaturated organic material which is copolymerizable with acetylene and contains at least one double bond, said polymerization being carried out at a temperature of at least about 40° C. in an inert organic liquid medium with the aid of a polymerization catlayst system consisting solely of both (a) at least one salt of the group consisting of nickel orthophosphate, nickel sulphate, cobalt toluate, cobalt iodoplatinate and the chlorides, bromides, nitrates, acetates, naphthenates, formates and oxalates of cobalt and ickel, and (b) at least one substance of the group consisting of the alkali-metals and the alkali metal acetylides.

References Cited in the file of this patent

UNITED STATES PATENTS

| 2,485,544 | Nelson et al. | Oct. 18, 1949 |
| 2,932,633 | Juveland | Apr. 12, 1960 |

FOREIGN PATENTS

| 570,538 | Canada | Feb. 10, 1959 |

UNITED STATES PATENT OFFICE
CERTIFICATE OF CORRECTION

July 9, 1963

Patent No. 3,097,195

George W. Kennerly et al.

It is hereby certified that error appears in the above numbered patent requiring correction and that the said Letters Patent should read as corrected below.

Column 5, line 1, for "preferred" read -- preformed --; line 41, for "phenyacetylene" read -- phenylacetylene --; column 6, line 59, for "ickel" read -- nickel --; column 6, line 66, for "2,485,544" read -- 2,485,454 --.

Signed and sealed this 25th day of February 1964.

(SEAL)
Attest:

ERNEST W. SWIDER
Attesting Officer

EDWIN L. REYNOLDS
Acting Commissioner of Patents